United States Patent
Sugiyama

[11] Patent Number: 5,841,942
[45] Date of Patent: Nov. 24, 1998

[54] CODE RECORDING APPARATUS

[75] Inventor: Kenji Sugiyama, Yokosuka, Japan

[73] Assignee: Victor Company of Japan, Ltd., Yokohama, Japan

[21] Appl. No.: 889,938

[22] Filed: Jul. 10, 1997

Related U.S. Application Data

[63] Continuation of Ser. No. 285,828, Aug. 4, 1994, abandoned.

[30] Foreign Application Priority Data

Aug. 4, 1993 [JP] Japan ................................. 5-212208

[51] Int. Cl.⁶ ............................. H04N 5/917; H04N 7/26
[52] U.S. Cl. ........................................... 386/109; 386/111
[58] Field of Search .................................. 386/109, 111, 386/112, 27, 33, 46, 34, 124; 348/384, 400, 401, 402, 409, 415, 394, 395, 603, 397, 390, 411, 412; H04N 5/917, 7/26

[56] References Cited

U.S. PATENT DOCUMENTS

| | | | |
|---|---|---|---|
| 5,113,255 | 5/1992 | Nagata et al. | 348/416 |
| 5,377,051 | 12/1994 | Lane et al. | 360/33.1 |
| 5,386,234 | 1/1995 | Veltman et al. | 348/409 |
| 5,410,350 | 4/1995 | Kato et al. | 348/400 |
| 5,440,345 | 8/1995 | Shimoda | 348/411 |

OTHER PUBLICATIONS

"Video Coding With Motion–Compensated Interpolation For CD–ROM Applications"; Puri et al; 8376 Signal Processing Image Communication; 2(1990) Aug.; No. 2, Amsterdam, NE.

*Primary Examiner*—Robert Chevalier
*Attorney, Agent, or Firm*—Jacobson, Price, Holman & Stern, PLLC

[57] ABSTRACT

The disclosed code recording apparatus can record broadcasted interframe prediction-coded code trains on a storage medium in such a way that pictorial images of smooth motion can be reproduced from the storage medium during a high speed search. When the code trains of highly efficiently coded moving pictorial images are broadcasted, the prediction code trains prediction-coded between frames or fields are decoded by a decoding circuit to obtain reproduced images. The obtained reproduced images are coded independently in frame or field to form independent code trains decodable independently. Further, a part of the prediction code train is replaced with the independent code train obtained by the coding circuit using a code replacing circuit. The code trains thus obtained are recorded in the storage medium.

5 Claims, 4 Drawing Sheets

CODE RECORDING APPARATUS

This is a continuation of application Ser. No. 08/285,828, filed Aug. 4, 1994 which was abandoned upon the filing hereof.

BACKGROUND OF THE INVENTION

1. Field of the Invention

The present invention relates to a recording apparatus such as VTR for recording moving pictorial images, and more specifically a code recording apparatus for recording code trains of moving pictorial images coded on the basis of frame or interframe prediction when these code trains are broadcasted or transmitted.

2. Description of the Prior Art

In opposition to analog signal broadcasting systems such as the NTSC system, for instance, it has been studied such a digital signal broadcasting system that moving pictorial image information can be converted into digital signals through a high efficiency encoding method and the obtained digital code trains are broadcasted as satellite broadcasting, ground wave broadcasting, CATV, etc.

Where the image information broadcasted as described above is required to be recorded using a VTR, for instance, if the video signals equivalent to the ordinary NTSC system can be obtained by decoding the received compressed code trains perfectly, it is also possible to record the obtained video signal information using home use VTR of the VHS system now being used widely.

On the other hand, in the case of the VTR for recording digital video signals, it is possible to record the video signals by first decoding the code trains into reproduced video signals as described above and then encoding the reproduced video signals again.

However, it is also possible to consider another method of recording the code trains as they are, and then decoding the recorded code trains for reproduction. This recording method is rational, because the video signals can be reproduced without deteriorating the picture quality due to recording and without use of any additional encoding apparatus.

In the case of the storage medium such as a video tape, however, it is necessary to reproduce the video signals for high speed search, that is, to display the picture at high speed so that the viewer can search the picture while seeing it. In this case, a part of the picture is eliminated and the eliminated picture is displayed at high speed. In the case of the home use VTR in practice, the tracks along which video signals are recorded are read obliquely with reproducing heads, with the result that one field is divided into several sub-fields in the horizontal direction and different parts of the divided sub-fields of the several different fields are displayed, respectively at the same time. Further, in the case of a video disk, only one field within several fields is displayed.

In the case of the recording media for digital information using a high efficiency encoding method, on the other hand, during the interframe prediction encoding, it is impossible to reproduce only a part of the frame. Therefore, as with the case of the MPEG system standardized by ISO, the information is coded independently within a frame at the rate of one to several frames. Further, during the high speed search, only the independent frames (referred to as I frames) are reproduced.

Further, the above-mentioned processing can be made either in unit of frame or in unit of field. In the following description, however, only the processing in unit of frame is explained in further detail.

In the case of the interframe prediction encoding, however, since the variable length encoding is usually executed, the quantity of the generated codes fluctuates, so that the end positions of the generated codes are not uniform and thereby fluctuate on the storage medium on which the frame information is recorded, respectively. As a result, when the recorded information is accessed to read only the independent frames (I frames) for high speed research, it takes time to start reading the recorded I frames. In addition, since the code quantity of the I frame is fairly large as compared with that of the average frame, a long time is required to read the I frame codes, with the result that the number of the I frames obtained during high speed search is reduced considerably.

Accordingly, the frame rate displayable during the high speed search is reduced, and the picture is reproduced under such a condition that a large number of frames are omitted. For instance, when only the independent frame (I frame) codes are obtained during the rate of 5 frames per second at the high speed search, only 5 frames are displayed per second.

Depending upon the reading capability of the reproducing apparatus, the above-mentioned rate is determined on how many I frames are included in the recorded code trains, so that the number of pictures which can be displayed increases with increasing rate of I frames included in the recorded code trains.

An example of the prior art encoding apparatus will be described hereinbelow with reference to FIG. 1, which shows an interframe prediction encoding apparatus for digital broadcasting.

In FIG. 1, video signals inputted through an video input terminal 31 are given to a prediction signal subtracter 32. The prediction signal subtracter 32 subtracts prediction signals from the inputted video signals to obtain differential signals. The obtained differential signals are given to an intraframe coder 6.

The intraframe coder 6 executes discrete cosine transformation (referred to as DCT hereinafter) to the differential signals, quantizes the transformed coefficients on the basis of a predetermined step width, and further compresses the quantized signals into variable length codes. The compressed variable length codes are given to a channel encoder 33 and an intraframe decoder 3, respectively.

The intraframe decoder 3 executes the processing opposite to the intraframe coder 6. The obtained reproduced differential signals are given to a prediction signal adder 4. The prediction signal adder 4 adds the prediction signals given by an interframe predictor 12 to the reproduced differential signals. The obtained reproduced video signals are given to the interframe predictor 12.

The interframe predictor 12 delays the inputted reproduced video signals by one frame to form the interframe prediction signals. The obtained interframe prediction signals are given to the prediction signal subtracter 32 and the prediction signal adder 4, respectively.

Further, since the interframe prediction processing is of circular processing, there exists a possibility that error is accumulated between the coder and the decoder. To overcome this problem, the interframe prediction is intermitted about 1/100 for each picture to refresh the error. This refreshed portion is shifted frame by frame so that all the pictures can be refreshed in several seconds.

On the other hand, in the channel encoder 33, an error correction code suitable for the transmission path is added to the compressed codes, so that video signals having a format suitable for the transmission path can be formed. The obtained video signals are outputted through a signal output terminal 34 for broadcasting.

Here, a prior art code recording apparatus for recording the broadcasted video signals on a storage medium will be explained with reference to FIG. 2. In FIG. 2, in the recording operation, only the error correction code and the signal format are replaced with those suitable for the storage medium, without decoding the video signals.

In more detail, the broadcasted signals are inputted to a channel decoder 2 through a signal input terminal 1. The channel decoder 2 demodulates (decodes) the inputted signals and executes correction processing. The obtained signals are given to a channel encoder 9.

The channel encoder 9 adds an error correction signal suitable for the storage medium to the output signals of the channel decoder 2, to generate signals having a format suitable for the storage medium. The generated signals are recorded on a storage medium 11.

A prior art reproducing apparatus for reproducing the signals recorded on the storage medium will be explained with reference to FIG. 3.

In FIG. 3, the signals read from the storage medium 11 are given to a channel decoder 21. The channel decoder 21 demodulates (decodes) the signals and executes the error correction processing. The demodulated signals are given to an intraframe decoder 3.

Here, the processing of this channel decoder 21 corresponds to the processing opposite to the channel encoder 9 shown in FIG. 2 (not the channel encoder 33 shown in FIG. 1).

In FIG. 3, the intraframe decoder 3 executes the processing opposite to that of the intraframe coder 6 show in FIG. 1. The obtained reproduced differential signals are given to a prediction signal adder 4. The prediction signal adder 4 adds prediction signals given from an interframe predictor 12 to the reproduced differential signals. The obtained reproduced video signals are outputted through a video output terminal 23 and simultaneously given to the interframe predictor 12.

The interframe predictor 12 delays the inputted reproduced signals by one frame to form the interframe prediction signals. The obtained interframe prediction signals are given to the prediction signal adder 4.

In the case where the digital signals obtained by coding the video signals on the basis of the intraframe or interframe prediction coding method are broadcasted, the received code trains are coded independently in frame for only refresh, so that this encoding method is not suitable for the reproduction during a high speed search. Therefore, the part of the frame coded independently in frame is not sufficient, so that there exists a problem in that sufficient video signals cannot be reproduced during the high speed search, in the case of the digital VTF in which the received code trains are directly recorded.

SUMMARY OF THE INTENTION

With these problems in mind, therefore, it is the object of the present invention to provide a code recording apparatus which records broadcasted code trains coded in accordance with the interframe prediction into a storage medium so that a smooth picture motion can be obtained in the picture when reproduced from the storage medium during a high speed search.

To achieve the above-mentioned object, the present invention provides a code recording apparatus for recording code trains of highly efficiently coded moving pictorial images, comprising: decoding means for decoding prediction code trains prediction-coded between frames or fields, to obtain reproduced images; coding means for coding the reproduced images independently in frame or field, to form independent code trains decodable independently; and code replacing means for replacing a part of the prediction code train with the independent code train obtained by the coding means.

Further, it is preferable that when the prediction code train includes bidirectional prediction code trains and one-way prediction code trains, the code replacing means replaces only the code trains coded on the basis of the one-way direction with the independent code trains, respectively.

Further, it is preferable that the code replacing means replaces a part of the prediction code train with the independent code train in such a way that start points of the independent code trains exist periodically at intervals of a predetermined code quantity.

Further, it is preferable that the code replacing means comprises: delaying means for delaying the prediction code train to synchronize the delayed prediction code train with the independent code train; selecting and outputting means for selectively outputting the delayed prediction code train and the independent code train for each frame or field; absorbing means responsive to the code trains outputted by the selecting and outputting means, for absorbing a change in code quantity generated when the code trains are selected and outputted; detecting means responsive to the delayed prediction code trains, for detecting an end of a frame or a field to output a first detection signal; counting means for counting the code quantity of the code train given to the absorbing means and outputting a second detection signal when the counted code quantity reaches a predetermined code quantity; and control means for outputting a control signal to the selecting and outputting means, when the first and second detection signals are given simultaneously.

DETAILED DESCRIPTION OF THE EMBODIMENTS

Figure 1:
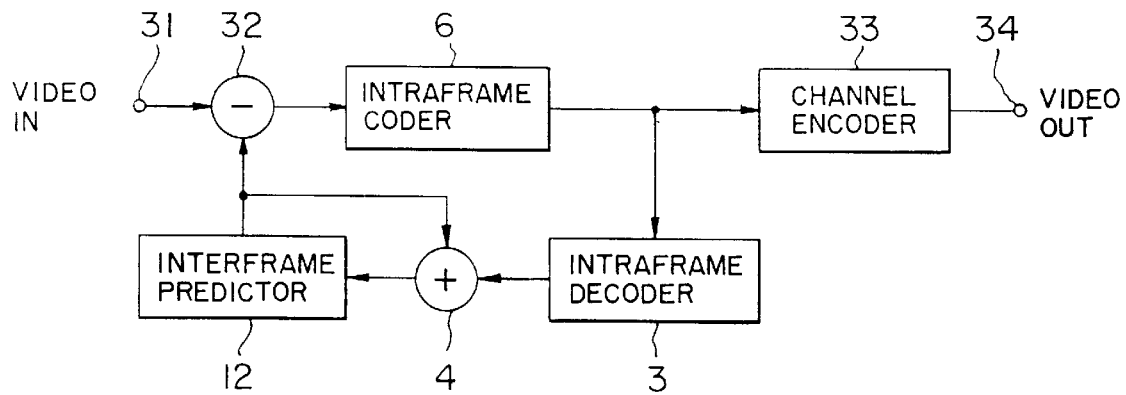
FIG. 1 is a block diagram showing a prior art coding apparatus.

An embodiment of the code recording apparatus according to the present invention will be described hereinbelow with reference to FIG. 4. Further, only the recording apparatus and the reproducing apparatus according to the present invention are explained hereinbelow, because the prior art coding apparatus as shown in FIG. 1 can be used as the coding apparatus for digital broadcasting.

Figure 4:
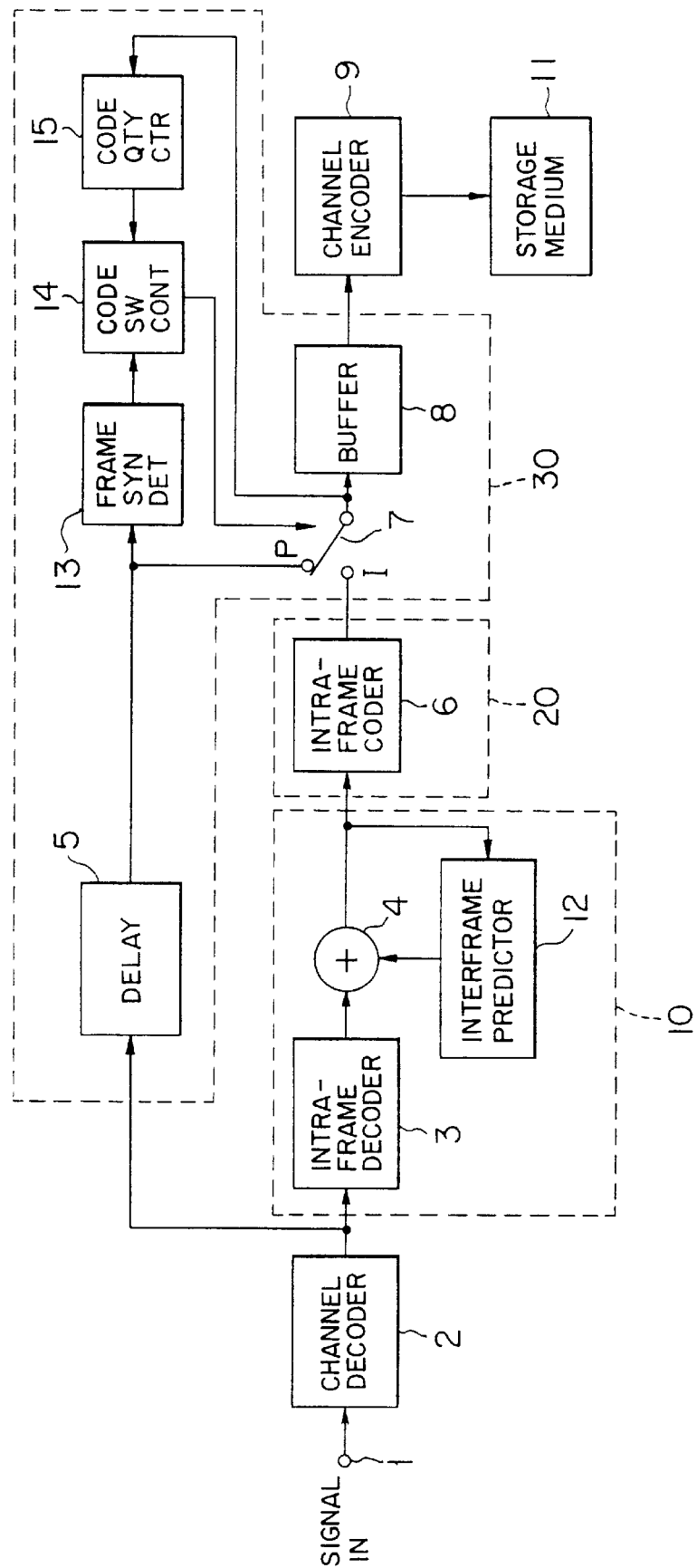
FIG. 4 is a block diagram showing an embodiment of the recording apparatus according to the present invention.

FIG. 4 is a block diagram showing an embodiment of the code recording apparatus according to the present invention. In the drawing, moving pictorial video signals (prediction code trains) are inputted through a signal input terminal 1, and then given to a channel decoder 2. The channel decoder 2 demodulates (decodes) the inputted signal and executes error correction processing. The modulated video signals are given to a decoding circuit 10. The decoding circuit 10 decodes the video signals and gives the decoded video signals to a coding circuit 20 to code the video signals in frame. A part of each prediction code train inputted through the signal input terminal 1 is replaced with each independent code train (outputted by the coding circuit 20) by a code replacing circuit 30, and then given to a channel encoder 9. This channel encoder 9 adds an error correction signal suitable for the storage medium to the replaced code trains to form a signal having a format which can be suitably recorded on a storage medium 11.

The decoding circuit 10 is composed of an intraframe decoder 3, a prediction signal adder 4, and an interframe predictor 12. The coding circuit 20 is an intraframe coder 6. The code replacing circuit 30 is composed of a delay device 5, a change-over switch 7, a buffer 8, a frame synchronous detector 13, a code switching controller 14, and a code quantity counter 15.

Figure 2:
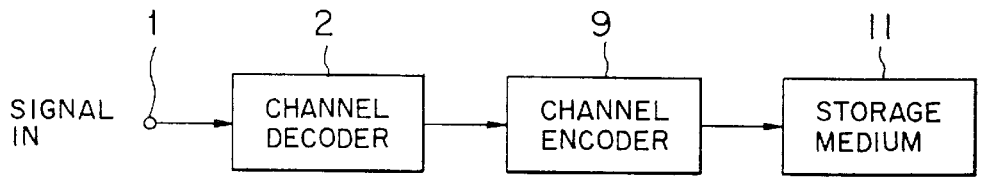
FIG. 2 is a block diagram showing a prior art code recording apparatus.

In the code recording apparatus shown in FIG. 4, there are further provided the intraframe decoder 3, the prediction signal adder 4, the delay device 5, the intraframe coder 6, the change-over switch 7, the buffer 8, the interframe predictor 12, the frame synchronous detector 13, the code switching controller 14, and the code quantity counter 15, in addition to the prior art code recording apparatus as shown in FIG. 2.

The broadcasted signals (prediction code trains) are inputted to the channel decoder 2 through the signal input terminal 1 for signal demodulation and error correction processing. The output of the channel decoder 2 is further given to the intraframe decoder 3 and the delay device 5, respectively.

In the same way as with the case of the prior art reproducing apparatus, the codes given to the intraframe decoder 3 are reproduced. The intraframe decoder 3 executes the processing opposite to that of the intraframe coder 6 shown in FIG. 1, and the obtained reproduced differential signals are given to the prediction signal adder 4.

The prediction signal adder 4 adds the prediction signals given by the interframe predictor 12 to the reproduced differential signals. The added reproduced signals are given to the intraframe coder 6 and the interframe predictor 12, respectively.

The interframe predictor 12 delays the inputted reproduced signals by one frame to generate interframe prediction signals. The generated interframe prediction signals are given to the prediction signal adder 4.

The operation of the intraframe coder 6 is the same as with the case of the intraframe coder 6 of the prior art coding apparatus as shown in FIG. 1. However, the coded signals are not the prediction differential signals, but the reproduced video signals are directly coded in frame. In this case, since the obtained coded signals are independent in frame, the obtained coded signals can be used for high speed search. The intraframe coded video signals are given to an I terminal of the change-over switch 7.

On the other hand, the output of the channel decoder 2 is given to the delay device 5. The code trains outputted by the delay device 5 are used to compensate for the delay caused through the intraframe decoder 3, the prediction signal adder 4, and the intraframe coder 6.

As a result of the delay provided by the delay device 5, the codes synchronized with the output of the intraframe coder 6 are given to a P terminal of the change-over switch 7.

The change-over switch 7 is normally switched to the P terminal, so that the interframe-coded codes are given to the buffer 8. The codes synchronized with the output of the intraframe coder 6 through the delay device 5 are also given to a frame synchronous detector 13. This frame synchronous detector 13 detects frame headers from the given code trains, and transmits a frame flag (the first detection signal) indicative of each frame end to the code switching controller 14.

On the other hand, the code quantity counter 15 counts the quantity of codes given to the buffer 8. When the counted value reaches a predetermined code quantity (i.e.) a transfer rate) which corresponds to an interval at which the independent frame is inserted between the prediction frame trains (e.g., 5 to 20 frames), the counter 15 gives a change enable flag (the second detection signal) to the code switching controller 14.

The code switching controller 14 gives a control signal to the switch 7 according to the given change enable flag and the frame flag. If the frame flag is given when the change enable flag is being given, the code switching controller 14 changes over the switch 7 to the I terminal. Further, if the succeeding frame flag is given when the change enable flag is being given, the code switching controller 14 changes over the switch 7 to the P terminal.

As described above, in response to the control signal given by the code switching controller 14, the I terminal of the change-over switch 7 is selected once for each 5 to 20 frames, and the codes coded independently in frame are given to the buffer 8. Therefore, the interframe coded frame is replaced with the intraframe independently coded frame at a rate of one to 5 to 20 frames.

Further, the buffer 8 is used to absorb the change in the code quantity caused whenever the interframe coding is changed to the intraframe coding or vice versa. Further, the reason why the change-over switch 7 is controlled according to the code quantity is as follows: it is convenient for the high speed search that the independent code train exists for each predetermined code quantity.

Figure 5:
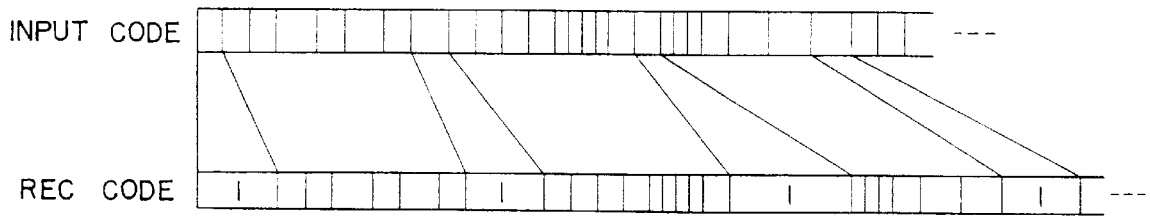
FIG. 5 is an illustration showing an example of the status of a code train.

The state of the code trains will be described hereinbelow with reference to FIG. 5. In FIG. 5, since the quantity of codes of the independent (I) frame is larger than that of the prediction frame in general, the total code quantity of the recorded codes becomes larger than that of the inputted codes. Further, although the period of the I frames is not necessarily constant with respect to the number of frames, there exists no specific inconvenience.

In FIG. 4, the codes (whose code quantity fluctuations have been absorbed by the buffer 8) are given to the channel encoder 9. The channel encoder 9 adds an error correction code suitable for the storage medium to the given codes, so that video signals suitable for the storage medium with respect to the signal format can be obtained. The obtained video signals are recorded on a storage medium 11.

Further, during the intraframe independent coding, when bidirectional prediction frames (referred to as B frame, hereinafter) are included as with the case of MPEG system, it is preferable to execute the intraframe independent coding on the basis of the one-way prediction frames (referred to the P frame, hereinafter).

The reasons are as follows: P-frame reproduced video signals can be obtained by decoding only the P frames; the code quantity of the P frame is smaller than that of the B frame, so that when coded in frame on the basis of the P frame, the increase rate of the code quantity is small; the quantization of the P frame is finer than that of the B frame and thereby the picture quantity of the P frame is superior to that of the B frame, etc.

Therefore, when coded independently in frame on the basis of the one-way predictive frames, in FIG. 4, the frame synchronous detector 13 detects the frame headers from the code trains obtained by the delay device 5. Only when the obtained code train is determined to be the P frame on the basis of the frame classification information included in the frame header, the frame synchronous detector 13 gives the frame flag indicative of a frame end to the code switching controller 14 for each frame.

The replacement of the frame types will be described hereinbelow with reference to FIGS. 6A and 6B. These drawings explain the frame types replaced by the code replacing circuit 30 of the code recording apparatus according to the present invention shown in FIG. 4.

Figure 6A:
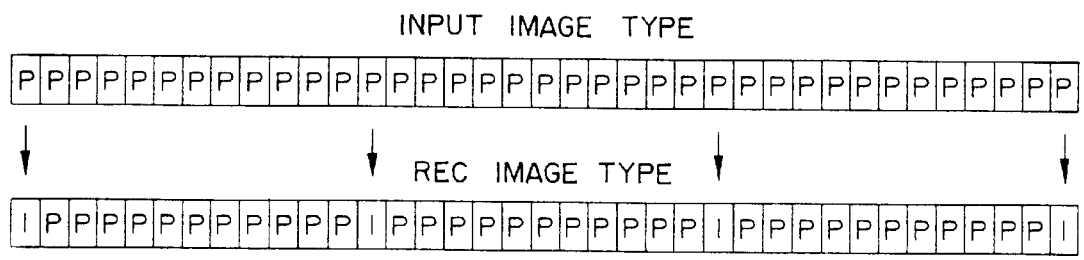
FIGS. 6A and 6B are illustrations for assistance in explaining the replacement of frame types.
Figure 6B:
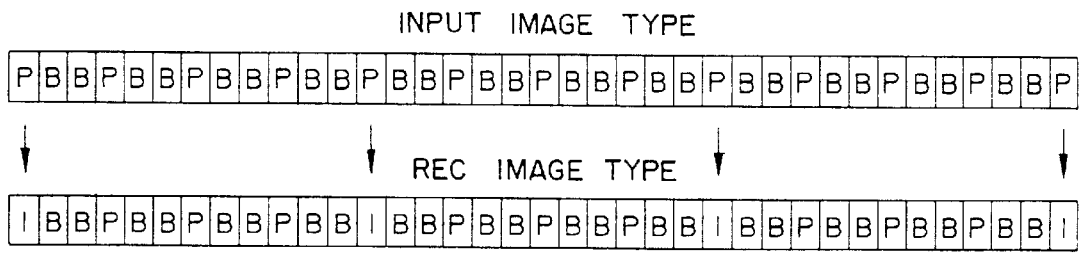

FIG. 6A shows an example in which the frame type of the inputted video signals is only one-way predictive (P) frame. In this case, the one-way predictive (P) frame is replaced with the independent (I) frame for each 12 frames. On the other hand, FIG. 6B shows an example in which the frame type of the inputted video signal is composed of both the one-way predictive (P) frame and the bidirectional predictive (B) frame. In this case, only the one-way predictive (P) frame is replaced with the independent (I) frame for each 12 frames.

In the code recording apparatus according to the present invention shown in FIG. 4, although the decoding processing and re-encoding processing are further required as compared with the prior art apparatus shown in FIG. 2, since the reproducing apparatus incorporated in the VTR can be utilized, in practice the newly added apparatus elements are only the delay device 5, the intraframe coder 6, the change-over switch 7, and the buffer 8, all shown in FIG. 4.

In these elements, since the intraframe coder 6 codes the video signals at a rate of one to 5 to 20 frames, it is also possible to realize a low speed search. In this case, however, the quantity of the codes to be delayed inevitably increases.

Figure 7:
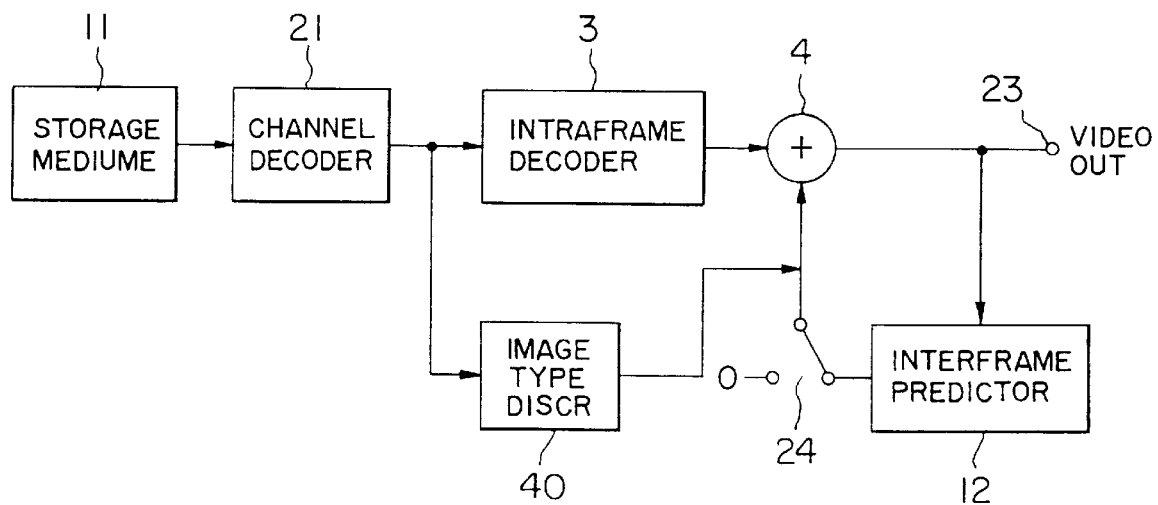
FIG. 7 is a block diagram showing an example of the reproducing apparatus related to the present invention.

An embodiment of the reproducing apparatus for reproducing video signals from the storage medium to which code trains are recorded by the code recording apparatus according to the present invention, will be described with reference to FIG. 7. In FIG. 7, the same reference numerals have been retained for the similar elements which have the same functions as with the case of the prior art reproducing apparatus shown in FIG. 3, without repeating any detailed description thereof.

Figure 3:
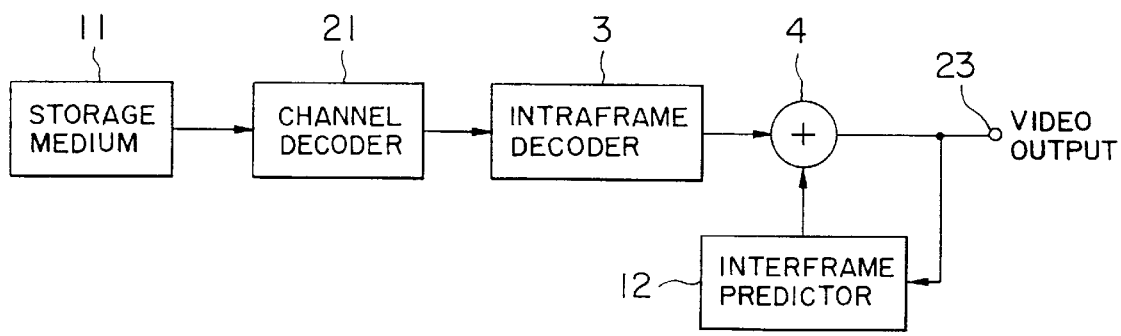
FIG. 3 is a block diagram showing a prior art reproducing apparatus.

In comparison with the prior art reproduced apparatus shown in FIG. 3, an image type discriminator 40 and a change-over switch 24 are additionally provided in FIG. 7. The operations of these elements are basically the same as the conventional elements and therefore well known, except that these elements are used to decode the I frames.

In FIG. 7, the video signals read from the storage medium 11 are given to a channel decoder 21. The channel decoder 21 demodulates (decodes) the read video signals and processes the demodulated signals for error correction. The output of the channel decoder 21 is given to an intraframe decoder 3 and an image type discriminator 40, respectively, This processing is executed in correspondence to the channel encoder 9 shown in FIG. 4 (not corresponding to the channel encoder 33 shown in FIG. 1).

The intraframe decoder 3 processes the demodulated signals of the channel decoder 21, which is opposite to the processing of the intraframe coder 6 shown in FIG. 1 or 4. The reproduced differential signals can be obtained from the prediction frames, and the reproduced video signals can be obtained from the I frames. These signals are given to a prediction signal adder 4.

In the case of the prediction frame, the prediction signal adder 4 adds the prediction signals given through the change-over switch 24 to the reproduced differential signals to obtain reproduced video signals. In the case of the I frame, the reproduced video signals of the intraframe decoder 3 are passed as they are through the adder 4. The reproduced video signals thus obtained are outputted through a video signal output terminal 23 and further given to an interframe predictor 12.

The interframe predictor 12 delays the reproduced video signals by one frame and then transmits the delayed video signals to the change-over switch 24. The change-over switch 24 gives the prediction signals to the prediction signal adder 4 in the case of the prediction frame, and the zero value to the same adder 4 in the case of the I frame, on the basis of the control signals given by the image type discriminator 40.

The image type discriminator 40 reads an identification flag indicative of the prediction frame or the independent frame from the code train, and the change-over switch 24 is controlled on the basis of this read identification flag.

During the high speed search, although only the I frames are decoded, since the codes of the I frame are not displayed at the ordinary image rate, even after the I frame has been decoded, the same picture is retained and outputted repeatedly until the succeeding I frame codes are reached.

As described above, in the code recording apparatus according to the present invention, code trains obtained by coding the broadcasted signals intraframe or interframe prediction coding are decoded; the obtained reproduced video signals are coded in frame independently; a part of the prediction-coded code train is replaced with the code train (independent code train) coded independently in frame; and the replaced code trains are recorded. Therefore, although the total code quantity increases, it is possible to record the independent codes larger than the independent codes included in the broadcasted code trains.

Further, since the code trains can be replaced in such a way that the start points of the independent codes exist periodically for each predetermined code quantity, it is possible to access the independent codes effectively. Accordingly, in the code recording apparatus according to the present invention, during the high speed search reproduction, it is possible to read many independent codes, so that more reproduced pictorial images can be obtained and thereby a high speed search picture whose motion is smooth can be obtained.

Further, the obtained reproduced pictures are formed on the basis of a plurality of different frames, and it is therefore possible to obtain a perfect one-frame image.

What is claimed is:

1. A code recording apparatus for recording code trains of high efficiently coded moving pictorial images, comprising:
   decoding means for decoding prediction code trains prediction-coded between frames or fields, to obtain reproduced images;
   coding means for coding the reproduced images independently in frame or field, to form independent code trains decodable independently; and
   code replacing means for replacing a part of the prediction code train with the independent code train obtained by the coding means to form code trains to be recorded, the code trains to be recorded having the prediction code trains, the part of which is replaced with the independent code trains and is not used for forming the code trains.

2. The code recording apparatus of claim 1, wherein when the prediction code train includes bidirectional prediction code trains and one-way prediction code trains, the code replacing means replaces only the code trains coded on the basis of the one-way direction with the independent code trains, respectively.

3. The code recording apparatus of claim 1, wherein the code replacing means replaces a part of the prediction code train with the independent code train in such a way that start points of the independent code trains exist periodically at intervals of a predetermined code quantity.

4. The code recording apparatus of claim 1, wherein the code replacing means comprises:

delaying means for delaying the prediction code train to synchronize the delayed prediction code train with the independent code train;

selecting and outputting means for selectively outputting the delayed prediction code train and the independent code train for each frame or field;

buffering means responsive to the code trains outputted by the selecting and outputting means, for absorbing change in code quantity generated when the code trains are selected and outputted;

detecting means responsive to the delayed prediction code trains, for detecting an end of a frame or a field to output a first detection signal;

counting means for counting the code quantity of the code train given to the absorbing means and outputting a second detection signal when the counted code quantity reaches a predetermined code quantity; and control means for outputting a control signal to the selecting and outputting means, when the first and second detection signals are given simultaneously.

5. A code recording apparatus for recording code trains of high efficiently coded moving pictorial images, comprising:

decoding means for decoding prediction code trains prediction-coded between frames or fields, to obtain reproduced images;

coding means for coding the reproduced images independently in frame or field, to form independent code trains decodable independently; and code replacing means for replacing a part of the prediction code train with the independent code train obtained by the coding means wherein when the prediction code train includes bidirectional prediction code trains and one-way prediction code trains, the code replacing means replaces only the code trains coded on the basis of the one-way direction with the independent code trains, respectively.

* * * * *